United States Patent [19]

De Long

[11] Patent Number: 5,608,521
[45] Date of Patent: Mar. 4, 1997

[54] POLARIZATION COMPENSATED IMAGING SPECTROMETER

[75] Inventor: Raymond K. De Long, Palos Verdes Estates, Calif.

[73] Assignee: TRW Inc., Redondo Beach, Calif.

[21] Appl. No.: 530,683

[22] Filed: Sep. 18, 1995

[51] Int. Cl.$^6$ .................................................. G01J 3/12
[52] U.S. Cl. ......................... 356/326; 356/328; 359/483
[58] Field of Search ................................. 356/300, 305, 356/326, 328, 331, 332, 334; 359/483, 487, 489

[56] References Cited

U.S. PATENT DOCUMENTS

| 2,303,906 | 12/1942 | Benford et al. . | |
|---|---|---|---|
| 4,299,486 | 11/1981 | Nogami et al. | 356/318 |
| 4,477,152 | 10/1984 | Comer . | |
| 4,634,276 | 1/1987 | Sharpe | 356/305 |
| 4,662,722 | 5/1987 | Buczek et al. . | |
| 4,697,888 | 10/1987 | Schmadel, Jr. et al. . | |
| 4,746,202 | 5/1988 | Perilloux et al. . | |
| 4,773,756 | 9/1988 | Blechinger | 356/334 |
| 4,923,262 | 5/1990 | Clay . | |
| 5,028,134 | 7/1991 | Bulpitt et al. | 356/328 |
| 5,080,486 | 1/1992 | Shirasaki et al. | 356/327 |
| 5,104,225 | 4/1992 | Masreliez | 356/356 |
| 5,233,405 | 8/1993 | Wildnauer et al. | 356/333 |
| 5,233,554 | 8/1993 | Conley et al. | 364/822 |
| 5,260,767 | 11/1993 | Cook | 356/326 |
| 5,285,255 | 2/1994 | Baranne et al. | 356/328 |

FOREIGN PATENT DOCUMENTS

| 2-61529 | 3/1990 | Japan | 356/305 |
|---|---|---|---|
| 5-196811 | 8/1993 | Japan | 359/483 |

*Primary Examiner*—F. L. Evans
*Attorney, Agent, or Firm*—Michael S. Yatsko

[57] ABSTRACT

A polarization compensated imaging spectrometer and method are set forth which include a compensating mirror. The mirror is selected to have a surface coating and angle of incidence to impart polarization into the reflected electromagnetic radiation which substantially compensates for polarization imparted by the spectrometer disperser.

23 Claims, 4 Drawing Sheets

POLARIZATION COMPENSATED IMAGING SPECTROMETER

BACKGROUND

Imaging spectrometers are adapted to form pictures of a scene in different wavelength bands. For example a visual scene image may be formed at a slit which passes a segment of the image scene for dispersal into its various electromagnetic radiation component wavelengths, i.e. spectral bands. The energy of each of the dispersed spectral bands is typically detected by a two-dimensional detector array. One dimension of the array determines spatial information whereas the orthogonal dimension detects spectral energy information. As the spectrometer is scanned in a direction normal to the slit the entire image scene is serially scanned and the energies of the spectral bands as well as spacial details are detected by the detector. At the detector array the received energy of the bands is dispersed over the array which converts intensity into digitized signals which are, in turn, processed by the overall spectrometer imaging system.

Grating type dispersers as well as prisms have been used to disperse the image segment into component wavelengths for detection. Particularly where gratings are used, a significant degree of polarization sensitivity is imparted into the dispersed, spectral bands. This imparted polarization sensitivity varies with wavelength and is typically greatest at shorter wavelengths. For visible and near visible light, the degree of polarization sensitivity imparted by a grating at wavelengths of approximately 400 nm is on the order of between 2–2.5% for a grating frequency of about 40 grooves per millimeter. The polarization sensitivity is affected by the coating material ruled onto the grating plus any other protective coatings, angle of incidence and grating frequency (number of lines/mm).

Where the energy of the received image is to be measured and compared in the frequencies of the bands for purposes of quantitatively assessing the scene, the grating imparted polarization affects the accuracy of the spectrometer for polarized scene, particularly at the shorter wavelengths. For example, for satellite based oceanographic study, electromagnetic radiation as visible and near visible light reflected from the oceans is polarized to a degree. Measurement of reflected scene energy would therefore be affected by the disperser (e.g., grating) induced polarization, depending upon the orientation of the spectrometer and its disperser relative to the scene polarization. If the disperser, for example, is disposed such that its imparted polarization is parallel to the scene polarization, band and resultant signals intensities at the array would be greater than if the disperser was positioned such that its imported polarization was in a plane perpendicular to the scene polarization, particularly at shorter wavelengths. Accordingly, the ability to accurately measure scene energies including any scene imparted polarizations is affected by the disperser imparted polarization.

There is, therefore, a need for a device and method to compensate and substantially correct for polarization which is imparted by the spectrometer disperser so that the spectrometer band signal intensities are not as sensitive to the relative orientation of the disperser to any scene polarization. More particularly there is a need for a simple device and method for substantially compensating for diffraction grating imparted polarization for an imaging spectrometer.

SUMMARY

There is, therefore, set forth according to the present invention, a polarization compensated imaging spectrometer which substantially compensates for disperser imparted polarization.

Broadly, the polarization compensated imaging spectrometer includes an optical element to disperse electromagnetic radiation, such as visible and near visible light, into at least a plurality of component spectral bands or wavelengths. Where the radiation is visible or near visible light, the disperser may be a prism or diffraction grating. To compensate for polarization imparted by the disperser, such as a grating, a compensating mirror is disposed to reflect the electromagnetic radiation. Based upon the surface coating of the mirror and its angle relative to incident electromagnetic radiation, the mirror imparts disperser corrective polarization in a manner to substantially compensate for the grating imparted polarization.

More specifically, where visible or near visible light is to be spectrally analyzed, the present invention is directed to a polarization compensated imaging spectrometer which includes foreoptics adapted to receive and focus the scene image onto a slit. The slit passes a strip segment of an image, that segment being dispersed by a grating into component wavelengths, i.e., spectral bands. The grating imparts a degree of polarization into the dispersed light. At shorter wavelengths of between 400 and 600 nm, this degree of polarization may range from approximately 2.5% to 0. It will be appreciated that the measurement of the degree of induced polarization is a non-linear function of the parameters of surface coating, grating frequency and angle of incidence recited above and therefore may have a different range. A detector array is provided to detect the spatial and spectral energy of each of the strip segments and convert it into signals proportionate to the received energy for analysis. As the image is scanned, the segments are serially detected to produce a composite of the scene spectral energies.

The compensating mirror(s) have reflective coatings which can be $Ag/MgF_2$, $Ag/SiO_2$, $Al/MgF_2$, Al or $Al/SiO_2$, any other similar reflective coating or multi-layer dielectric coatings. Dependant upon the coating used and the angle that the mirrors make relative to incident electromagnetic radiation, i.e., light, the mirrors introduce compensating polarization. Accordingly, the coatings and angles of incidence are selected such that the polarization imparted by the compensating mirrors substantially compensate for the polarization imparted by the grating. As a specific example, using an $Ag/MgF_2$ coated mirror at an angle of 40° relative to incident radiation, the imparted polarization by a grating, at particularly the lower wavelengths, is substantially compensated. Accordingly, the detector will receive spectral band signal energies substantially unaffected by grating imparted polarization.

By virtue of the polarization compensation according to the present invention, instrument imparted polarization is substantially compensated. Accordingly, spectral analyses including detection and measurement of any scene polarization are rendered more accurate by virtue of the minimization of any uncertainties which may be introduced due to disperser imparted polarization.

Still further, the compensating mirror can be oriented relative to the path of the electromagnetic radiation, e.g. light, to compensate for polarization contributed by the optical components of the instrument in addition to that imparted by the disperser.

DRAWINGS

These features and other advantages will become better appreciated with reference to the specification, claims and drawings wherein:

DESCRIPTION

Figure 1:
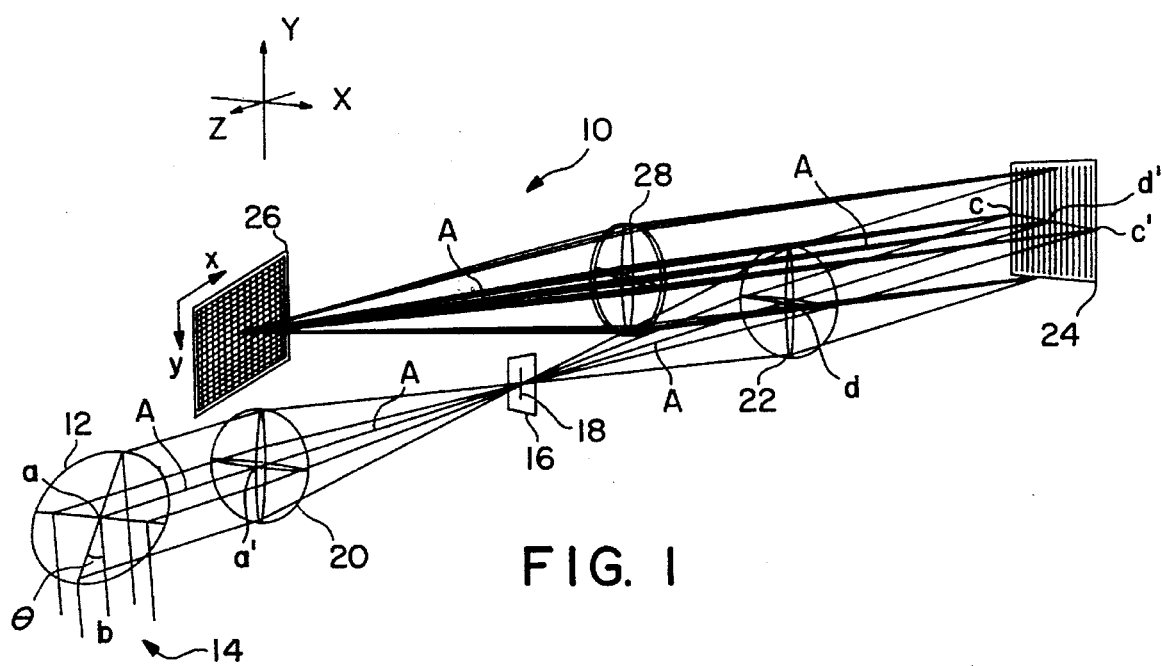
FIG. 1 is a schematic illustration of a polarization compensated spectrometer and method according to the present invention.

Turning to FIG. 1, an embodiment of a polarization compensated spectrometer 10 and method according to the present invention are illustrated. The spectrometer 10 is adapted to receive electromagnetic radiation such as visible and near visible light, direct along an optical path A and disperse it into its spectral components for detection, measurement and analysis by suitable devices. As an example, the spectrometer 10 can be disposed on an airborne or orbiting platform and used to spectrally analyze visible and near visible light reflected from the earth's surface. Reflected light, particularly from oceans, can be polarized to an extent. It has been found that prior spectrometers, particularly those using a grating for dispersing, dispersing the light into spectral bands can introduce polarization into the electromagnetic radiation. This instrument imparted polarization imparts radiometric inaccuracies into the spectrometer. For example, where the scene energy being analyzed is polarized, such as with invisible and near visible light reflected from oceans, the spectrometer induced polarization can result in varying sensitivity affecting the accuracy of the spectrometer to detect and measure the reflected scene energy. The spectrometer 10 and method according to the present invention are adapted to minimize spectrometer induced polarization and therefore enhance the accuracy of the spectrometer 10, particularly where scene radiometric properties are sought to be measured.

Continuing reference to FIG. 1, the spectrometer 10 includes a compensating mirror 12 arranged and adapted to fold and reflect incident radiation, shown generally as 14, along the optical path A toward a barrier 16. The barrier 16 includes a slit 18 adapted to pass a segment of the reflected incident radiation. To focus the radiation reflected by the compensating mirror 12, the spectrometer 10 can include foreoptics including a foreoptic lens 20. The foreoptic lens 20 focuses the radiation onto the barrier 16 and slit 18. As the image scene is scanned by spectrometer 10 the image segments passed by the slit 18 form, in sequence, the entire spectral and spacial scene image for analysis by the spectrometer 10.

The segment of the image passed by the slit 18 diverges as shown in FIG. 1 and is collimated by a collimating lens 22 along the optical path A onto a disperser such as a ruled diffraction grating 24. The grating 24 disperses the incident electromagnetic radiation segment into component, spectral wavelength, bands. The component spectral bands are reflected by the grating 24 turning the optical path A as shown in FIG. 1 and directing the spectral bands to a detector array 26. The detector array 26 can be an intensified charge couple device (CCD) type television camera, an unintensified CCD camera or other two-dimensional detector array. The detector array 26 can include a 256 spacial pixels arranged in columns in the "x" direction as shown in FIG. 1 and 128 spectral pixel rows, in the visible portion of the wavelength spectrum, arranged in the "y" direction. Each row of the spectral pixels in the "y" direction is adapted to detect a spectrum of the image as dispersed by the grating 24 and digitize the energy signals for measurement and analysis. The columns in the "x" direction receive and provide spacial information. Alternating in the "y" direction, the detector array 26 can include 256 spectral rows, in the short wave infrared wavelength spectrum, whereas 256 spatial columns are arranged in the "x" direction. Any other suitable two dimensional detector array adapted to detect and measure spatial as well as spectral information could be used as well. At the detector array 26, the radiometric intensities of the spectral bands are converted into signals proportionate to those intensities.

To focus the spectral bands from the disperser grating at 24 onto the detector array 26, the spectrometer 10 includes a detector lens 28 disposed between the grating 24 and detector array 26.

Figure 8:
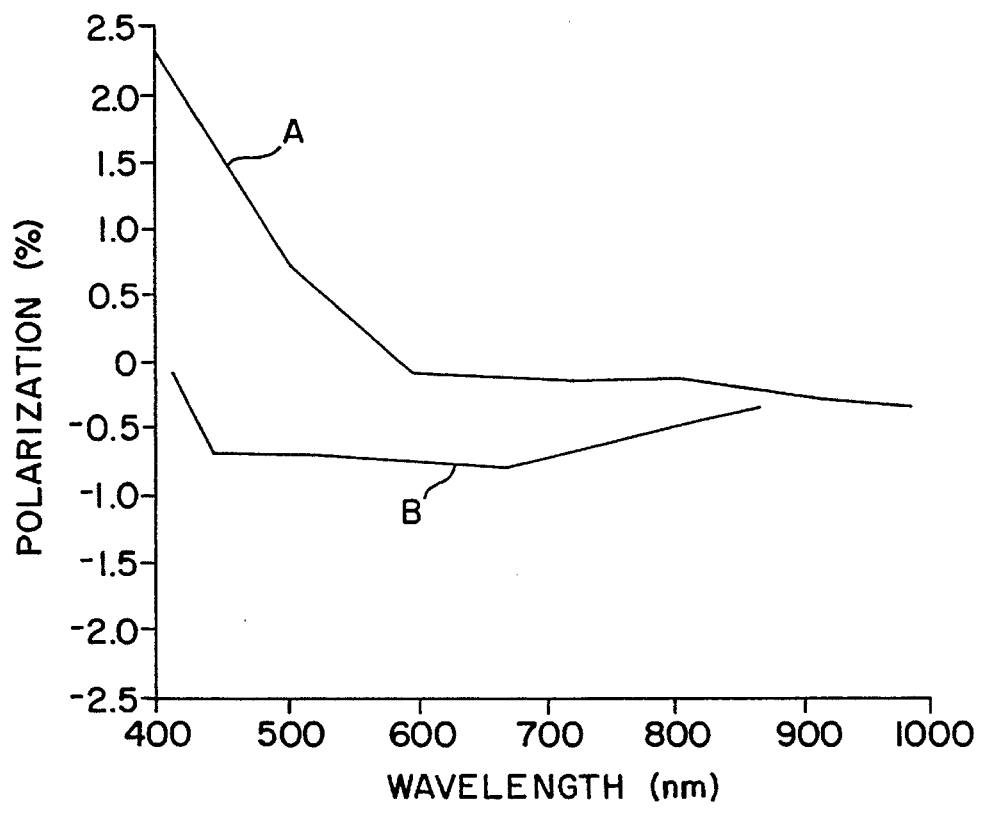
FIG. 8 is a graphic illustration of the measured polarization compensation according to the present invention using a reflective surface coating of Ag/MgF$_2$ at 40° angle of incidence.

As shown in FIG. 8, by graph line A, it is seen that the grating 26 imparts a degree of polarization to the dispersed light particularly at shorter wavelengths, i.e., in the range of 400–450 nm. At the short visible wavelengths referred above, the grating imparted polarization sensitivity has been determined to be most substantial and significant. The sensitivity can be affected by the coating material ruled onto the grating 24, which may be aluminum, plus any other protective coatings, angle of incidence or grating frequency (number of lines per millimeter). The degree of polarization imparted by the grating at the shorter wavelength may range from approximately 2.5% to 0%. Of course the degree of polarization may have a different range depending on the parameters recited above with respect to the grating 24.

At the detector array 26 the energy signals of the received scene image segment are measured and comparison is made in the frequencies of the bands for the purposes of quantitatively assessing the scene. Grating imparted polarization, depending upon the orientation of the spectrometer 10 and its dispersing grating 24 relative to the scene polarization, can result in radiometric measurement errors due to the affects of the grating imparted polarization upon the scene polarization. Grating imported polarization can, dependent upon the orientation of the grating to scene polarization, increase or decrease the energies of the bands received at the detector array 26 and the signals generated at the array 26, particularly at shorter wavelengths.

To substantially compensate for the polarization introduced by virtue of the grating at 24, the compensating mirror 12 is provided in the optical path A. Generally speaking the compensating mirror 12 is disposed to have a plane of incidence orthogonal to the plane of incidence for the grating at 26, is disposed at an angle θ relative to the optical path A and has surface properties selected to substantially compensate for the polarization introduced by the grating 24, particularly at those shorter wavelengths. Angle θ and the compensating mirror 12 surface properties are selected such that the compensating mirror 12, in addition to folding the optical path A, imparts polarization substantially compensating for the polarization imparted by the grating 24, particulary at the shorter wavelengths.

With reference to FIG. 1, the compensating mirror 12 has a plane of incidence defined by a line a—a', from the center of the compensating mirror 12 to the center of the foreoptic lens 20, and line a–b. Angle θ as illustrated in FIG. 1 defines the angle of incidence selected to substantially compensate for grating imparted polarization. Continuing with FIG. 1, the compensating mirror plane of incidence defined by lines a–a', a–b is substantially orthogonal to the plane of incidence for the grating 24 defined by the surface normal to the grating at 24. As illustrated, the plane of incidence for the grating 24 is defined by line c—c' and a line from the center of the culminating lens 22 to the grating 24 shown as d—d'. As can be appreciated with reference to FIG. 1, the plane of incidence for the compensating mirror 12 lies substantially in planes "Y–Z" whereas the plane of incidence for the grating 24 lies in planes "X–Z" which are substantially orthogonal to the plane of incidence for the compensating mirror 12.

Figure 3:
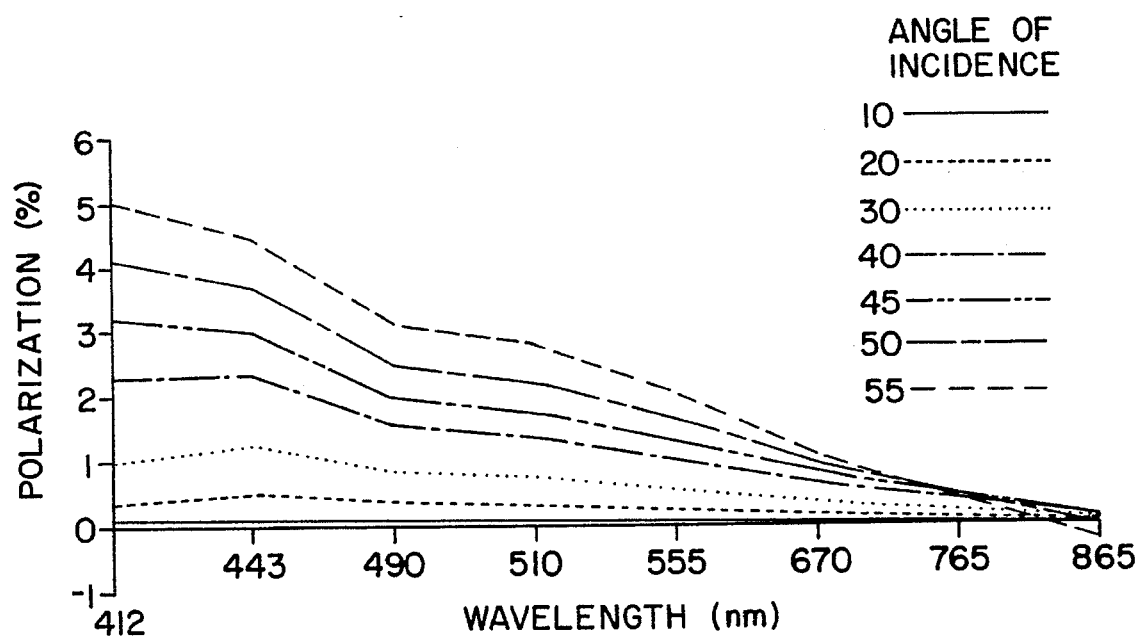
FIG. 3 is a graphic illustration of the polarization of a reflective surface coating of Ag/MgF$_2$ measured versus angle of incidence.
Figure 4:
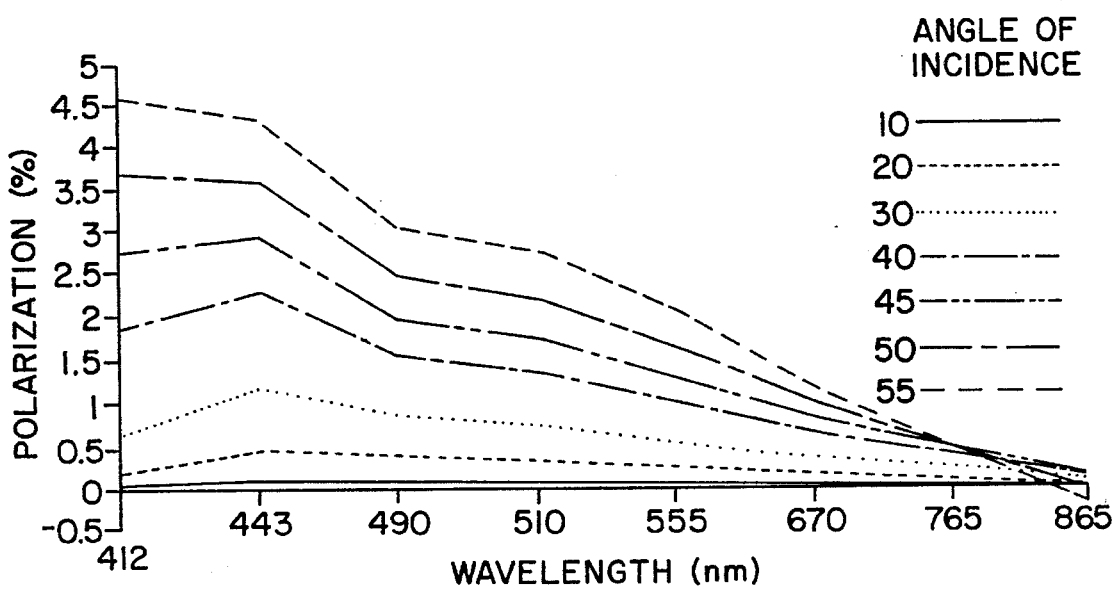
FIG. 4 is a graphic illustration of the polarization of a reflective surface coating of Ag/SiO$_2$ measured versus angle of incidence.
Figure 5:
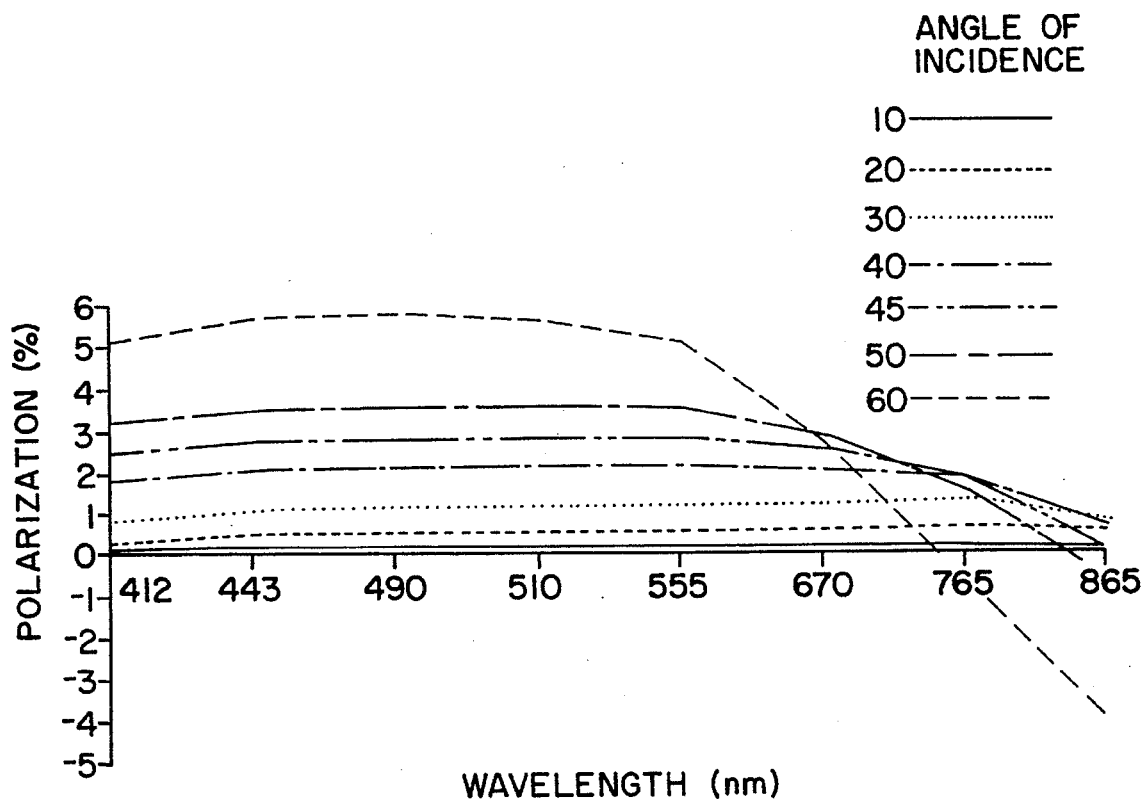
FIG. 5 is a graphic illustration of the polarization of a reflective surface coating of AL/MgF$_2$ measured versus angle of incidence.
Figure 6:
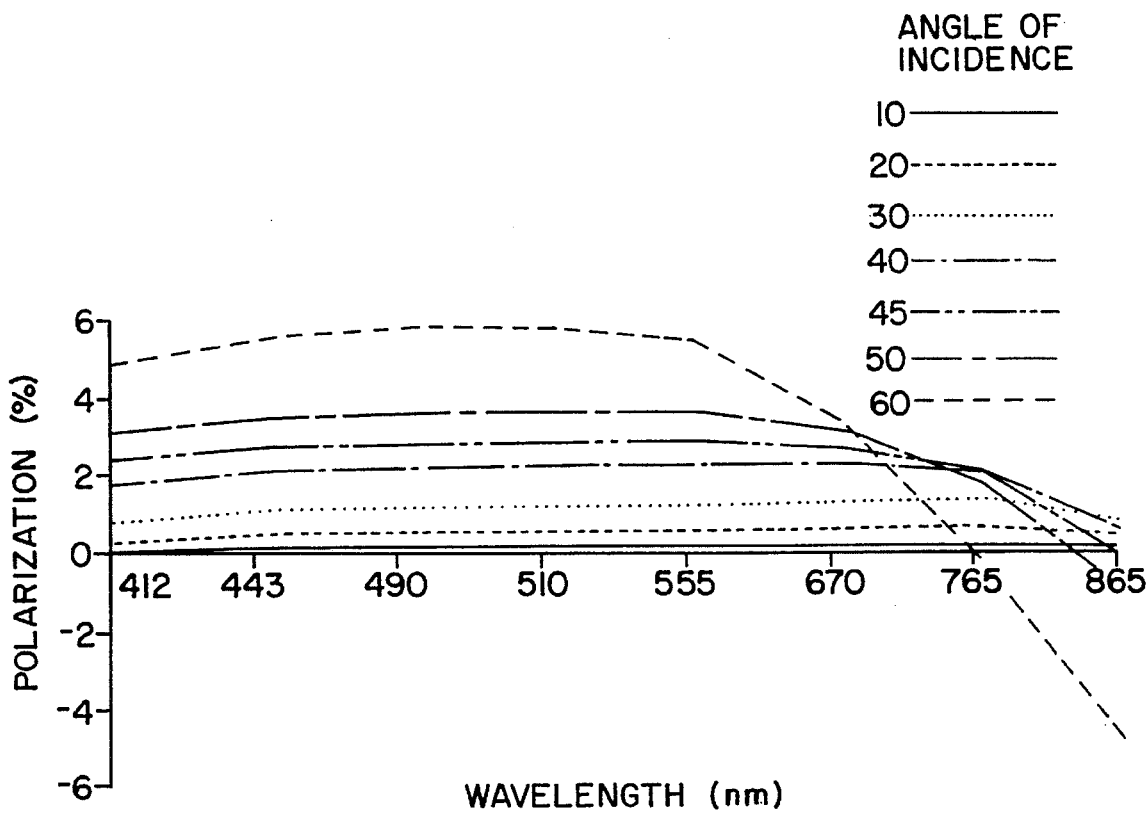
FIG. 6 is a graphic illustration of the polarization for a reflective surface coating of Al/SiO$_2$ measured versus angle of incidence.

In addition to arranging the compensating mirror 12 to have a plane of incidence orthogonal to the plane of incidence for the grating 24, the compensating mirror 12 is arranged at the angle θ to induce various percentages of polarization into the reflected light. With reference to FIG. 3 it is seen that if the surface of the compensating mirror 12 is selected to be Ag/MgF$_2$, the angle of incidence θ of 10°, 20°, 40°, 45°, 50° and 55° induce various percentages of polarization into the reflected light at wavelengths ranging from 412 to 865 nm. This ability to polarize can advantageously, according to the spectrometer 10 and method of the present invention, substantially correct for the polarization imparted by the grating 24 so that, particularly at shorter wavelengths, polarization attributed to scene polarization can be accurately measured substantially unaffected by any polarization imparted by the grating 24. Similarly, FIG. 4 shows the percentage of polarization imparted using a compensating mirror 12 with a surface coating of Ag/SiO$_2$ versus the same angles of incidence for wavelengths between 412 and 865 nm. Likewise FIGS. 5 and 6 illustrate the same information for compensating mirrors 12 having a reflective coating of Al/MgF$_2$ and Al/SiO$_2$ respectively.

Figure 7:
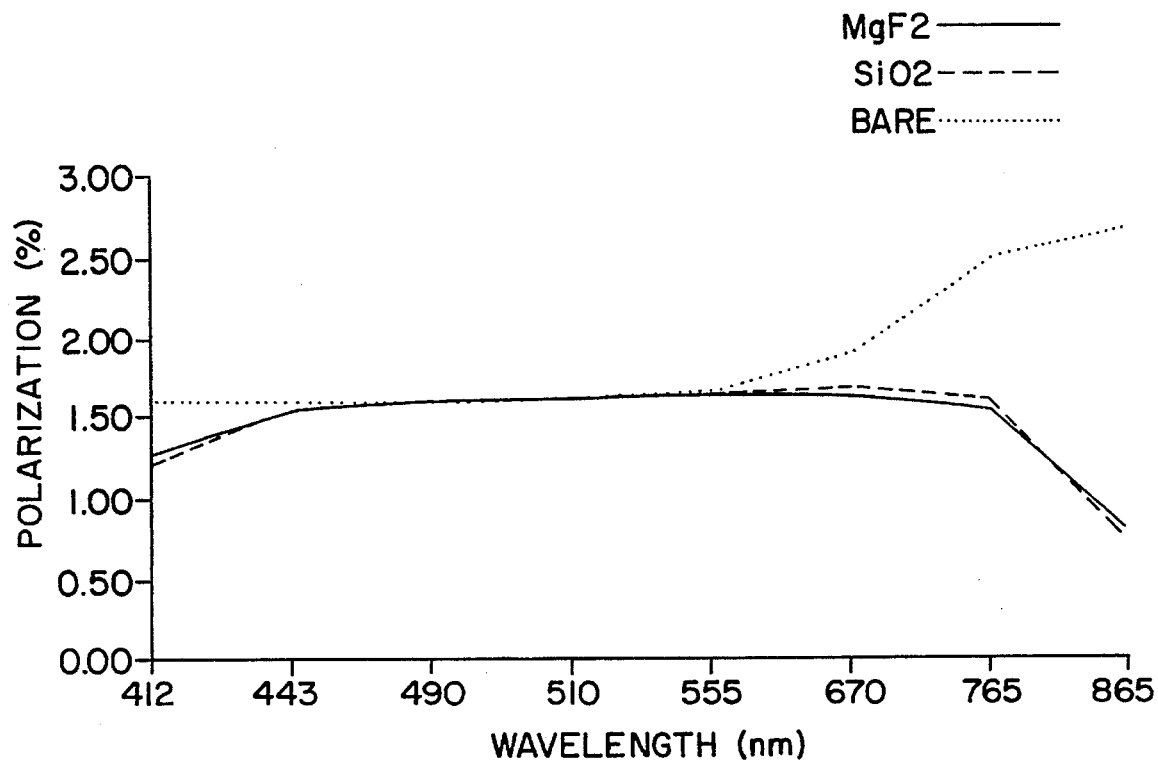
FIG. 7 is a graphic illustration of the measured polarization of a reflective surface of aluminum at 35° angle of incidence with coatings of MgF$_2$, SiO$_2$ and bare.

With reference to FIG. 7, the percentage of polarization is illustrated with a compensating mirror 12 of aluminum disposed at an angle θ of 35° relative to the optical path A versus a range of wavelengths with coatings of MgF$_2$, SiO$_2$ and bare (with no coating).

It is seen that these various compensating mirrors with their coatings can be selected, in view of their ability to impart polarization characteristics versus angle of incidence, to substantially compensate for polarization introduced by the grating 24. By measuring or calculating the polarization introduced by the grating 24, or other dispersers, such as a prism, and selecting a compensating mirror 12 and its angle of incidence θ and coatings, if desired, the polarization to be imparted by the grating 24 can be substantially compensated by the compensating mirror 12. Further, the compensating mirror 12 acts to fold the optical path which can advantageously result in the spectrometer 10 having a more compact configuration. This feature may be important, particularly where the spectrometer 10 must fit within the confines of a satellite.

With reference to FIG. 8, the effects of using a compensating mirror 12 are illustrated. Line A shows the percentage of polarization imparted into dispersed electromagnetic radiation, e.g., light, by the grating 24. As discussed above, the percentage of polarization imparted by the grating 24 is typically most marked at the shorter wavelengths. This polarization imparted by the grating 24 would, absent the compensation according to the present invention, pass to and effect radiometric detection at the detector array 26. If the incoming electromagnetic radiation to the spectrometer 10 is polarized, the grating 24 imparted polarization can result in radiometric errors depending upon the orientation of the spectrometer 10 and disperser, i.e. grating 24, to the image or scene related polarization. The foregoing can contribute to inaccuracies, particularly where image related spectral energy is to be measured.

Line B in FIG. 8 shows the substantial compensation of the grating imparted polarization, particularly at shorter wavelengths, when a Ag/MgF$_2$ compensating mirror 12 arranged to define an angle θ of 40° relative to incident electromagnetic radiation, e.g., light, is used.

At shorter wavelengths of approximately 400 nm, it is seen that while the grating 24 imparts a percentage of polarization of approximately 2.4% (line A), as compensated by the compensating mirror 12 that percentage of polarization is substantially compensated, such that the polarization of the electromagnetic radiation directed to the detector array 26 is approximately 0.2%. Similarly, at a wavelength of approximately 450 nm, the percentage of polarization of the grating 24 alone is approximately 1.5%, however, as compensated by an Ag/MgF$_2$ compensating mirror 12 making an angle θ of 40° relative to incident radiation, the percentage of polarization detected at the detector array 26 is substantially compensated, to approximately 0.7%.

Accordingly it can be understood that by selecting the compensating mirror 12 and its coatings and arranging it to define appropriate angles θ relative to the optical path, the polarization imparted into the spectral bands of electromagnetic radiation as dispersed by the grating 24 can be substantially compensated particularly at shorter wavelengths.

Accordingly, radiometric errors of spectral detection can be reduced, particularly at those shorter wavelengths.

Figure 2:
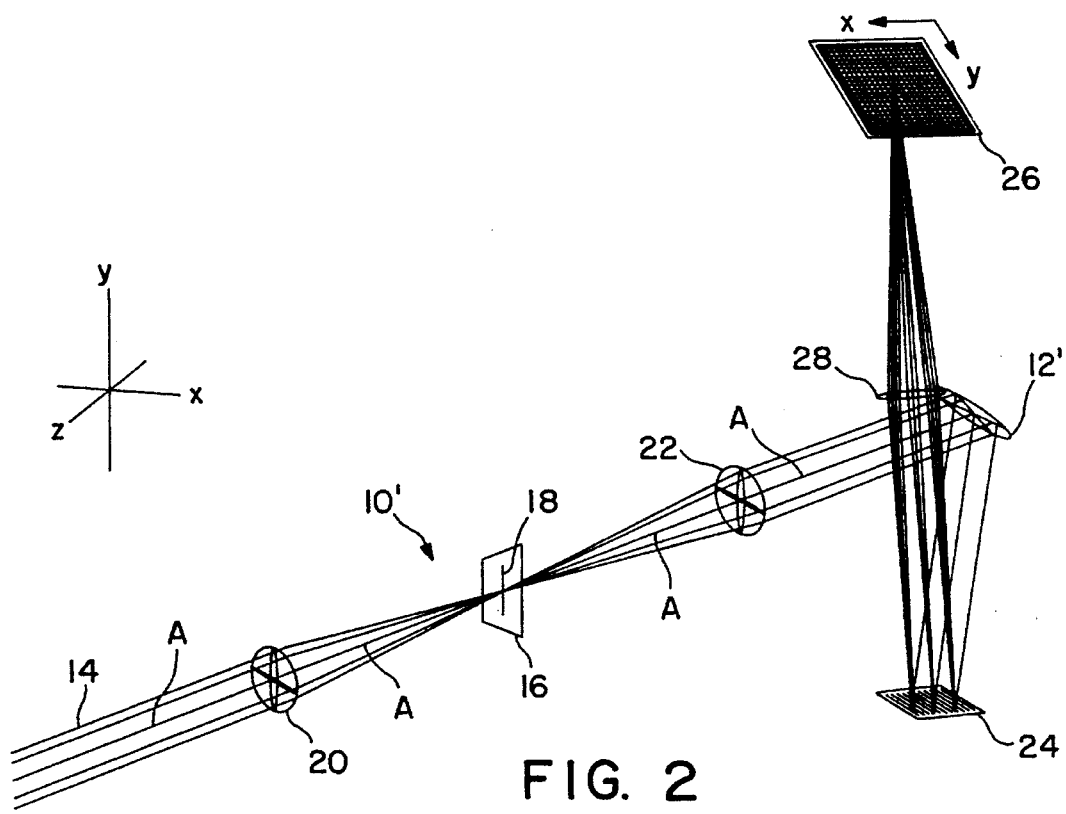
FIG. 2 is a schematic illustration of an alternative embodiment of a polarization compensated spectrometer and method according to the present invention.

With reference to FIG. 2, an imaging spectrometer 10', is shown. Similar components in FIG. 2 to those in FIG. 1 will have similar reference numbers.

According to this embodiment, the compensating mirror 12' is disposed between the collimating lens 22 and dispersing grating 24. As with the embodiment of FIG. 1, the plane of incidence for the compensating mirror 12' is orthogonal to the plane of incidence for the grating 24. In FIG. 2, the plane of incidence for the compensating mirror lies in plane "X–Z" whereas the plane of incidence for the grating 24 lies in plane "Y–Z". When the electromagnetic radiation is thereafter dispersed by the grating 24, the compensation introduced by the compensating mirror 12' substantially compensates for the polarization subsequently imparted by the grating 24. Like the previous embodiment, the compensating mirror 12 basically compensates for polarization which will subsequently be imparted by the grating 24. As with the prior embodiment, the compensating mirror 12' will be arranged at the correct angle θ relative to the optical path A to substantially compensate for polarization to be imparted by the grating 24.

As can also be appreciated, the compensation for polarization imparted by the disperser can also occur subsequent to dispersion. That is the compensating mirror could be positioned in the optical path subsequent to dispersion by the grating to substantially compensate for grating imparted polarization. As with the prior embodiments described herein, the compensating mirror disposed between the disperser and the detector array would have a plane of incidence orthogonal to the plane of incidence for the disperser and would be arranged at a preselected angle θ to impart the appropriate polarization compensation.

While I have described the polarization compensated imaging spectrometer according to the present invention as including disperser gratings, it is to be understood that the spectrometers 10, 10' and the method for compensating for polarization according to the present invention can also be used to substantially compensate for polarization imparted by other dispersers such as prisms. Further, the compensating mirror can also be adapted and arranged relative to the optical path to substantially compensate for any polarization imparted by other elements disposed in the path such as folding mirrors, lenses and the like which inherently impart some polarization into the electromagnetic radiation. Still further multiple compensating mirrors, their coatings and angles of incidence can be selected to, cumulative, provide for polarization compensation.

While I have shown and described certain embodiments of the polarization compensation imaging spectrometer and method according to the present invention, it is to be understood that it is subject to modifications and changes without departing from the spirit and scope of the dependent claims.

We claim:

1. A polarization compensated imaging spectrometer comprising:
    a disperser to spectrally disperse incoming electromagnetic radiation, the disperser imparting polarization into the incoming electromagnetic radiation; and
    a compensating mirror disposed before or after the disperser and having a surface to reflect and impart polarization into the reflected electromagnetic radiation, the mirror being oriented relative to incident electromagnetic radiation to reflect and polarize incident electromagnetic radiation to compensate for the polarization imparted by the disperser.

2. The spectrometer of claim 1 wherein the disperser is a prism.

3. The spectrometer of claim 1 wherein the disperser is a grating.

4. The spectrometer of claim 3 wherein the electromagnetic radiation includes wavelengths between about 400 nm and 1000 nm and the compensating mirror surface is disposed at an angle θ between 25° and 70° relative to the incident electromagnetic radiation.

5. The spectrometer of claim 4 wherein said mirror surface is Ag/MgF$_2$ and the angle θ is about 30°–60°.

6. The spectrometer of claim 4 wherein the mirror surface is Ag/SiO$_2$ and the angle θ is about 30°–60°.

7. The spectrometer of claim 4 wherein the mirror surface is selected from the group consisting of Ag/MgF$_2$, Ag/SiO$_2$, Al/MgF$_2$, Al/SiO$_2$ and Al.

8. A polarization compensated imaging spectrometer comprising:
    a grating to spectrally disperse incoming electromagnetic radiation;
    a detector to measure the spectral energy of the dispersed radiation, the grating imparting polarization into the measured electromagnetic radiation; and
    a compensating mirror disposed in the path of the electromagnetic radiation and having a surface to reflect and impart polarization into the reflected electromagnetic radiation, the mirror surface being positioned to reflect and polarize incident electromagnetic radiation to compensate for the polarization imparted by the grating.

9. The spectrometer of claim 8 wherein the electromagnetic radiation is of wavelengths of about between 400 nm and 1000 nm to and the mirror surface is disposed at an angle θ between 25° and 70° relative to the incident electromagnetic radiation.

10. The spectrometer of claim 8 wherein said mirror surface is Ag/MgF$_2$ and said mirror surface is disposed at an angle θ which is about 30°–60°.

11. The spectrometer of claim 8 wherein said mirror surface is Ag/SiO$_2$ and said mirror surface is disposed at an angle θ which is about 30°–60°.

12. The spectrometer of claim 8 wherein the surface is selected from the group consisting of Ag/MgF$_2$, Ag/SiO$_2$, Al/MgF$_2$, Al/SiO$_2$ or Al.

13. A polarization compensated imaging spectrometer comprising:
    foreoptics to receive and to focus electromagnetic radiation;
    a detector to spectrally detect electromagnetic radiation, the path between the foreoptics and detector defining the optical path for the spectrometer;
    a disperser disposed in the optical path to spectrally disperse electromagnetic radiation for spectral detection by the detector, the disperser imparting a first polarization to the dispersed electromagnetic radiation; and
    a compensating mirror disposed in the optical path and having a surface to reflect electromagnetic radiation and impart a second polarization to incident electromagnetic radiation, the second polarization compensating for the first polarization to minimize detection of said first polarization at the detector.

14. The spectrometer of claim 13 wherein the foreoptics impart a third polarization to the electromagnetic radiation, the compensating mirror oriented relative to the optical path such that the second polarization imparted by the compensating mirror compensates for the first and third polarizations to minimize detection of the first and third imparted polarizations at the detector.

15. The spectrometer of claim 12 wherein the compensating mirror is disposed between the disperser and the detector.

16. The spectrometer of claim 13 wherein the disperser is a grating.

17. The spectrometer of claim 16 wherein the compensating mirror is disposed between the grating and the detector.

18. The spectrometer of claim 17 further including a barrier disposed between the grating and the foreoptics, the barrier including a slit, the foreoptics focusing upon the barrier and the slit passing a portion of the focused electromagnetic radiation to the grating.

19. The spectrometer of claim 16 wherein the electromagnetic radiation is of wavelengths between 400 nm and 1000 nm and the mirror surface is selected from a group consisting of Ag/MgF$_2$, Ag/SiO$_2$, Al/MgF$_2$, Al/SiO$_2$ and Al.

20. The spectrometer of claim 16 wherein said mirror surface is positioned at an angle of between 25° and 70° relative to incident electromagnetic radiation.

21. A method for providing a polarization compensated spectral image to a detector comprising:
    dispersing the image into a plurality of spectral image bands for detection by the detector, the dispersion imparting polarization into the bands; and reflecting the image before or after dispersing with a mirror disposed at an angle relative to incident light to compensate for the polarization imparted by dispersion.

22. The method of claim 21 including dispersing the image with a grating and positioning the mirror in relation to the incident image to define an angle between 25° and 70° to impart polarization into the reflected image to compensate for the polarization imparted by the grating.

23. A method for spectral analysis of electromagnetic radiation comprising:

directing the electromagnetic radiation along a path to a detector adapted to detect the spacial and spectral aspects of the image, dispersing the electromagnetic radiation along the path into a plurality of spectral bands, the dispersion imparting polarization into the diffracted electromagnetic radiation bands, and reflecting the electromagnetic radiation along the path with a surface disposed at an angle relative to the path to reflect and impart compensating polarization into the electromagnetic radiation to compensate for dispersion imparted polarization.

* * * * *